(12) United States Patent
Guo et al.

(10) Patent No.: US 11,923,675 B2
(45) Date of Patent: Mar. 5, 2024

(54) SYSTEMS AND METHODS FOR LIQUID PRESENTATION DETECTION

(71) Applicant: QUALCOMM Incorporated, San Diego, CA (US)

(72) Inventors: Guoyong Guo, San Jose, CA (US); Cheong Kun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/644,888

(22) Filed: Dec. 17, 2021

(65) Prior Publication Data

US 2023/0198243 A1    Jun. 22, 2023

(51) Int. Cl.
*H02H 5/00* (2006.01)
*H02H 1/00* (2006.01)

(52) U.S. Cl.
CPC ............ *H02H 5/00* (2013.01); *H02H 1/0007* (2013.01)

(58) Field of Classification Search
CPC ................................ H02H 5/00; H02H 1/0001
See application file for complete search history.

(56) References Cited

U.S. PATENT DOCUMENTS

| | | | | |
|---|---|---|---|---|
| 7,161,491 B2* | 1/2007 | Garcia | ................. | H04B 1/3833 340/604 |
| 9,612,991 B2* | 4/2017 | Leinonen | ............ | G06F 13/4081 |
| 10,236,683 B2 | 3/2019 | Bacon et al. | | |
| 10,451,659 B2* | 10/2019 | Chang | .............. | G01R 19/16576 |
| 11,133,623 B2* | 9/2021 | Tyrrell | .................... | H01R 13/70 |
| 2012/0119696 A1* | 5/2012 | Picard | ....................... | H02J 7/00 320/107 |
| 2014/0015476 A1* | 1/2014 | Kondo | ................ | H02J 7/00304 320/107 |
| 2019/0079037 A1* | 3/2019 | Jol | ...................... | H01R 13/6683 |
| 2019/0109480 A1* | 4/2019 | Hsu | ............................ | G05F 1/56 |
| 2019/0302047 A1* | 10/2019 | Park | ....................... | G01N 27/045 |
| 2020/0142941 A1 | 5/2020 | Box et al. | | |
| 2020/0259298 A1* | 8/2020 | Tyrrell | .................. | H01R 13/70 |
| 2020/0333382 A1* | 10/2020 | Lee | ........................ | G01R 31/58 |
| 2021/0050924 A1* | 2/2021 | Choi | ..................... | G06F 1/1684 |

OTHER PUBLICATIONS

International Search Report and Written Opinion—PCT/US2022/052042—ISA/EPO—dated Mar. 31, 2023.
Rogers A., "Introduction to USB Type-C", Microchip Technology Inc, Jan. 30, 2015, pp. 1-20.

* cited by examiner

*Primary Examiner* — Henry Tsai
*Assistant Examiner* — Christopher A Daley
(74) *Attorney, Agent, or Firm* — Haynes and Boone, LLP (57) ABSTRACT

A data interconnect system includes: a plurality of pins arranged within a receptacle, a first one of the pins being a power pin, wherein the pins are electrically isolated from each other within the receptacle; a first switching network including a first plurality of parallel switching devices, each of the parallel switching devices of the first plurality of parallel switching devices coupling a respective one of the pins to a node; a first current path from the node to ground, the first current path including a current device; and a second current path, parallel to the first current path, the second current path including a resistor coupling the node to ground.

29 Claims, 7 Drawing Sheets

SYSTEMS AND METHODS FOR LIQUID PRESENTATION DETECTION

TECHNICAL FIELD

This application generally relates to electronic circuits and, more particularly, to detecting liquid in a data interconnect system.

INTRODUCTION

Universal Serial Bus (USB) cable plugs and receptacles provide data and/or power and come in a variety of formats. One of the newer formats is Type-C, which is allows for plugging in either an up or down orientation. To achieve this, the shape of the receptacle and plug are the same up or down, and the ports may be host-mode only, device-mode only, or dual-role, and both the data and power roles can be independently and dynamically swapped in some instances. A Downstream Facing Port (DFP) may be associated with a host, and it is similar to a legacy Type-A port. An Upstream Facing Port (UFP) may be associated with a device and is similar to a legacy Type-B port. Some ports may be Dual-Role Ports (DRPs), which include ports that may transition between DFP and UFP port states until an attached event occurs. In some instances, DRPs may be dynamically swapped after an initial attached event.

One application of USB Type-C devices is in portable devices, such as smart phones and the like. A noted failure point for some smart phones is that they may be exposed to liquids, such as water. Unwanted liquid exposure may cause short-circuits among various components inside the phone as well as causing short-circuits between pins within the receptacle. A short circuit between pins of the receptacle has the potential to cause a surge of electricity into internal components of the system, thereby causing damage.

There is a need in the art for techniques to detect the presence of liquid within a data interconnect receptacle (e.g., a USB receptacle) in a robust, yet uncomplicated way.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a data interconnect system including: a plurality of pins arranged within a receptacle, a first one of the pins being a power pin, wherein the pins are electrically isolated from each other within the receptacle; a first switching network including a first plurality of parallel switching devices, each of the parallel switching devices of the first plurality of parallel switching devices coupling a respective one of the pins to a node; a first current path from the node to ground, the first current path including a current device; and a second current path, parallel to the first current path, the second current path including a resistor coupling the node to ground.

In an additional aspect of the disclosure, a data interconnect system includes: a plurality of pins arranged within a receptacle, wherein the pins are electrically isolated from each other in the receptacle; a first switching network including a first plurality of parallel switching devices, each of the parallel switching devices of the first plurality of parallel switching devices coupling a respective one of the pins to a first node; a current device coupled to the first node; a second switching network, the second switching network including a second plurality of parallel switching devices, each of the parallel switching devices of the second plurality of parallel switching devices coupling a respective one of the pins to a second node, wherein the second node is coupled to ground; a power source coupled to the first node; and a resistor coupling the first node to ground.

In an additional aspect of the disclosure, a method includes: controlling a switching network, including causing the switching network to open and close a plurality of parallel switching devices, wherein each parallel switching device of the plurality of parallel switching devices is coupled to a respective pin of a data interconnect receptacle, further wherein controlling the switching network includes: closing a first switching device of the plurality of parallel switching devices, including creating a first conductive path between a first pin of the data interconnect receptacle and a voltage measuring device; and closing a second switching device of the plurality of parallel switching devices, including creating a second conductive path between a second pin of the data interconnect receptacle and the voltage measuring device; determining a presence of liquid between the first pin and a power source based on measuring a voltage created by closing the first switching device; and performing an action in response to determining the presence of liquid.

In an additional aspect of the disclosure, a method includes: controlling a first switching network, including causing the first switching network to open and close a first plurality of parallel switching devices, wherein each parallel switching device of the first plurality of parallel switching devices is coupled to a respective pin of a data interconnect receptacle, further wherein controlling the first switching network includes: closing a first switching device of the first plurality of parallel switching devices, including creating a first conductive path between a first pin of the data interconnect receptacle and a voltage measuring device; and controlling a second switching network, including causing the second switching network to open and close a second plurality of parallel switching devices, further wherein controlling the second switching network includes: closing a second switching device of the second plurality of parallel switching devices, including extending the first conductive path through a second pin of the data interconnect receptacle to ground through the second switching device; determining a presence of liquid between the first pin and the second pin based on measuring a voltage created by closing the first switching device and the second switching device; and performing an action in response to determining the presence of liquid.

In an additional aspect of the disclosure, a data interconnect receptacle includes: a plurality of pins arranged within the receptacle, wherein the pins are electrically isolated from each other within the receptacle; switching means for coupling and decoupling each pin of the plurality of pins to either power or ground; means for controlling the switching means; and means for determining a presence of liquid within the receptacle based at least in part on a voltage measured on a current path created by the switching means.

In an additional aspect of the disclosure, a non-transitory computer-readable medium having program code recorded thereon for liquid presence detection, the program code includes: code for controlling a plurality of switches to couple and decouple a plurality of data interconnect pins to either power or ground; code for measuring a voltage produced by a resistor within a current path created by the plurality of switches; and code for determining a presence of liquid on one or more of the data interconnect pins based at least in part on the voltage.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

Some liquid detection schemes rely on the Dual-Role Port (DRP) mode, when the configuration channel (CC) pins toggle, to generate an interrupt when there is a connection from a CC pin to ground. Once the interrupt is tripped, a software algorithm may cause the device to inject source current onto Side Band Use (SBU) pins and then to measure a resistance between the SBU pins and ground. The device may then determine that liquid is present if the resistance falls within a pre-programmed range. Once liquid is detected, the device may put the receptacle into sink only mode to avoid potentially destructive electrical discharge.

A potential downside of such solution is that it may only detect liquid between SBU pins and ground, such as from SBU to the external case (which is shorted to ground) or from SBU to ground through internal pins. Accordingly, such solution may not be able to detect liquid between other pins. Also, such solution may rely on the interrupt trip during DRP mode at the CC pins, and that may not be precise enough to catch some instances of liquid presence.

By contrast, various embodiments described herein provide a more robust system and method to detect liquid at a data interconnect, such as at a USB interconnect or other interconnect. In one example, a system may include a switching network that includes a plurality of parallel switching devices, where each one of the parallel switching devices couples a respective pin to a node. There is a current path from the node to ground, that current path may include a current device. There may also be a second current path, parallel to the first current path, and including a resistor coupling the node to ground. Hardware or software logic in the device may then go switch-to-switch, coupling each one of the pins in turn between a power source and the node. Should liquid be present, the voltage at the node would be expected to be within a range. Should the device detect the voltage of the node within the range, then the device may take action, such as displaying a warning to a user, putting the receptacle in a power sink mode, reducing a voltage or current at one or more pins of the receptacle, and the like.

In another example, one or more switching networks may allow the device to go switch-to-switch, to couple each of the pins to another pin or to ground via a node. The device may also apply source current to the node. In the case that liquid is present, the voltage at the node would be expected to be within a range and, once again, the device may take action based on the presence of liquid.

Various embodiments may include advantages over other systems. For instance, the embodiments described herein may provide for liquid detection between any arbitrary pin and any other arbitrary pin, between any pin and ground, or between any pin and a power supply. Therefore, such system is more likely to detect the presence of liquid, even when that liquid does not create an electrical path between SBU and ground. Furthermore, various embodiments may skip the interrupt step that other systems use to trigger a software process. In other words, such systems may avoid the imprecision of the interrupt step, replacing the interrupt step with a more precise measurement of voltage at the node.

While the examples herein are given with respect to USB Type-C, it is understood that the principles described herein may be applied to any multi-pin data interconnect. Furthermore, various implementations may be implemented in hardware only or in a combination of software and hardware.

Figure 1:
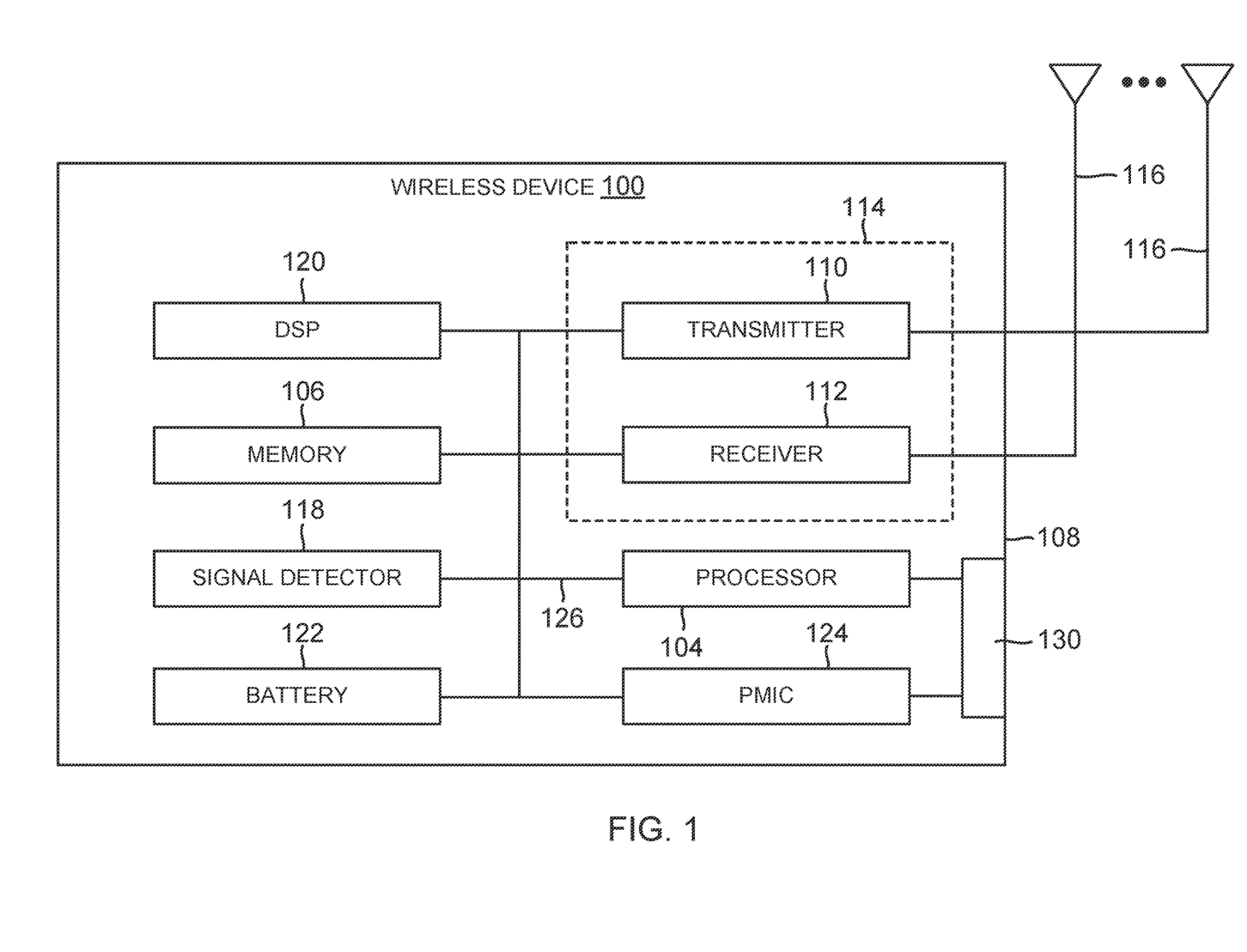
FIG. 1 illustrates a wireless communication network according to some aspects of the present disclosure.

FIG. 1 illustrates an example device 100 in which aspects of the present disclosure may be implemented. For example, the device 100 may be a battery-operated portable device, such as a cellular phone, a personal digital assistant (PDA), a handheld device, a wireless device, a laptop computer, a tablet, a smartphone, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as DC-to-DC conversion, battery charging, power-source selection, voltage scaling, power sequencing, etc. In some aspects, the PMIC 124 may include a battery-charging circuit (e.g., a master-slave battery-charging circuit) or other switched-mode power supply. The various components of the device 100 may be coupled together by a bus system 126, which may include a power bus, a control signal bus, and/or a status signal bus in addition to a data bus.

The device 100 may further include a data interconnect receptacle 130. Data interconnect receptacle 130 in this example is coupled to PMIC 124 and processor 104. Data interconnect receptacle 130 may be configured to accept a plug according to any of a variety of standards or proprietary designs. As one example, USB Type-C provides a standard that may define the shape and function of the data interconnect receptacle 130. It should be noted that data interconnect receptacle 130 is not limited to data transfer, as it may also provide power in some instances. Thus, in some instances, data interconnect receptacle 130 may be used to make a physical and electrical connection with a matching plug for data transfer with another device. In other instances, the data interconnect receptacle 130 may allow the device 100 to act as a power source or a power sink as appropriate.

Both processor 104 and PMIC 124 may be configured to include hardware and/or software logic to communicate with data interconnect receptacle 130, provide power to data interconnect receptacle 130, and control data interconnect receptacle 130 as appropriate. For instance, the liquid presence detection functionality that is described herein may be implemented in either one or both of the processor 104 and the PMIC 124.

Figure 2:
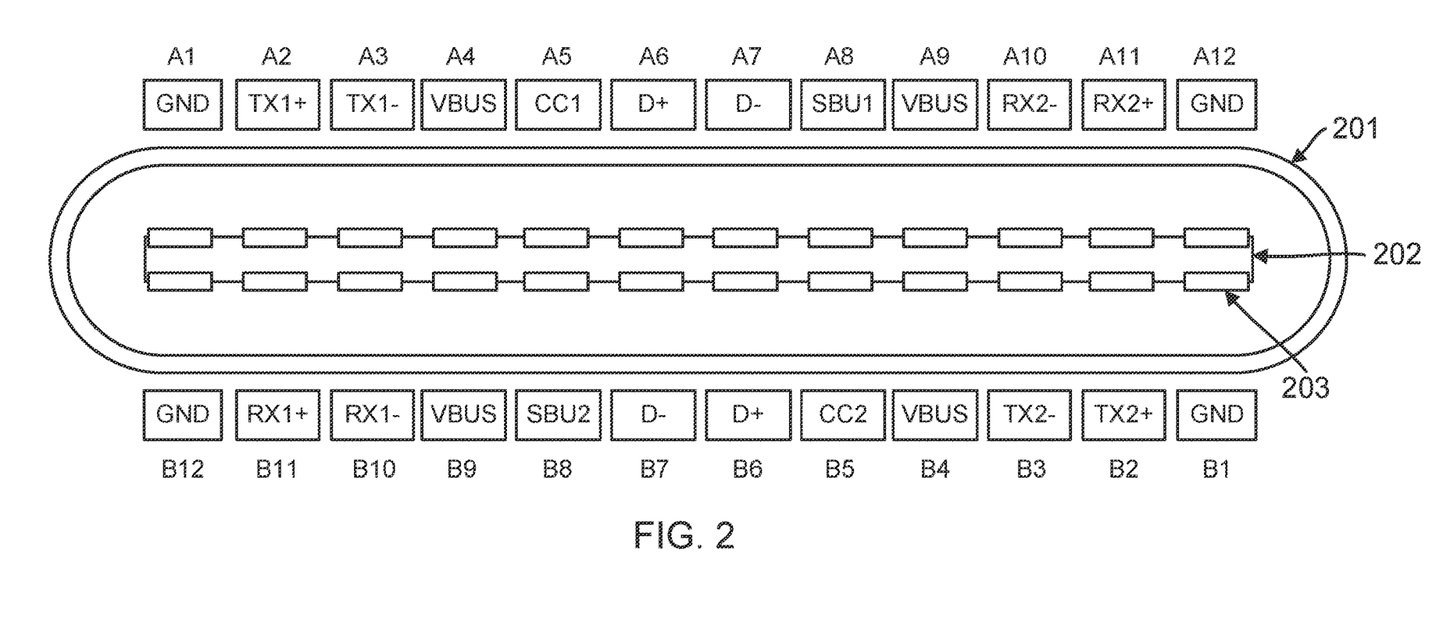
FIG. 2 is an illustration of an example configuration of data interconnect receptacle 130, according to one embodiment.

FIG. 2 is an illustration of an example configuration of data interconnect receptacle 130, according to one embodiment. In this example embodiment, data interconnect receptacle 130 conforms to a USB Type-C standard, though the scope of embodiments is not so limited. Data interconnect receptacle 130 includes an external case 201, which may be constructed at least partially of a conducting material. Data interconnect receptacle 130 also includes a substrate 202, which may include printed circuit board (PCB) material or other suitable material that is insulating and is fit for hosting conductors on its surface or even within internal layers. Data interconnect receptacle 130 also includes 24 pins, an example being shown as pin 203. Each of the pins includes a conductive material, such as copper, which is disposed upon the substrate material 202. There are pins on both the top and the bottom of the substrate material 202 and, though not shown, each of the pins may have conductive couplings to either or both of processor 104 and PMIC 124 of FIG. 1.

Data interconnect receptacle 130 is configured to receive a plug (not shown), which includes a complementary set of pins, each one of the pins corresponding to a respective pin of the data interconnect receptacle 130. When the plug is inserted into data interconnect receptacle 130, the conductor-to-conductor contact allows for electrical connection between the components of the device 100 (FIG. 1) and another device at the other end of a cable (also not shown) via the plug. Each of the pins is shown in FIG. 2 to include a pin name. For instance, pin 203 is labeled "GND", which indicates that it corresponds to a ground connection.

When water or another liquid is present within data interconnect receptacle 130, it may cause a short circuit between one or more pins and/or the external case 201. A short circuit between one or more pins may cause a malfunction issue. Consider an example in which a drop of water creates a short circuit between pin 203 (GND) and the pin immediately to its left, labeled "TX2+". In such an instance, a voltage signal at TX2+ may be grounded and, therefore, may be undetectable. Similarly, a short circuit between a power pin (e.g., VBUS) and another pin may cause a signal on that other pin to be undetectable or may cause damage to the receptacle 130 itself or to internal components of the device 100. The liquid presence detection systems and methods described herein may allow for device 102 detect liquid and then to perform one or more actions in response to the liquid. As noted above, some existing systems may only allow for detection of liquid between SBU pins and ground. By contrast, the systems and methods discussed herein may allow for liquid presence detection at any appropriate pin.

Figure 3:
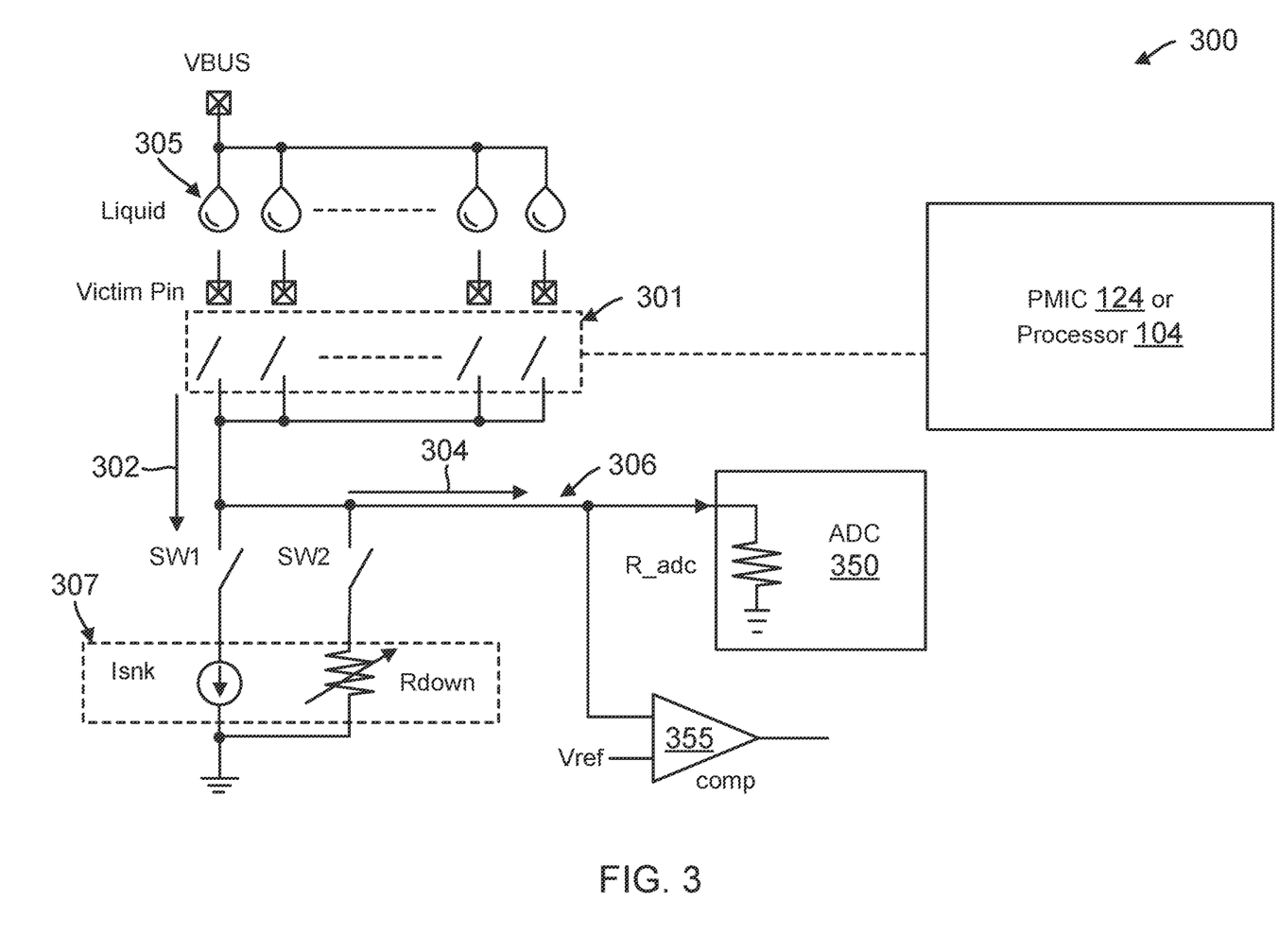
FIG. 3 is an illustration of a liquid presence detection circuit, according to various embodiments.

FIG. 3 is an illustration of a liquid presence detection circuit 300, which may be included within data interconnect receptacle 130, or split between data interconnect receptacle 130 and either or both of PMIC 124 and processor 104, according to various embodiments.

Liquid presence detection circuit 300 includes a switching network 301, which is coupled to, and controlled by, an integrated circuit device, such as PMIC 124 or processor 104. The switching network 301 includes a plurality of parallel switching devices, where each of the parallel switching devices couples a respective one of the Victim Pins to node 306. The switching network 301 may be implemented using any appropriate kind of switch, such as a network of parallel transistors.

The pin VBUS represents a power pin that is at a voltage VDD. The voltage level of VDD may be any appropriate voltage used in a handheld device. In some USB Type-C examples, VBUS may be 5V. Water droplets 305 are used to depict a liquid, which may be water or some other liquid and may provide an electrical connection between the VBUS pin and any of the Victim Pins. In this example, a Victim Pin may be any of the pins other than VBUS. Example pins are shown in FIG. 2.

The PMIC 124 or processor 104 may close any one of the parallel switches within switch network 301 or may close a combination of the parallel switches within network 301 at a given time to detect the presence of liquid 305. For instance, PMIC 124 or processor 104 may control switching network 301 to connect any one of RX, TX, CC, D, SBU, or GND pins (or a combination of those pins) to create a current path 302 through liquid 305, the particular Victim Pin, and current device 307 to ground. Of course, this assumes that the liquid 305 provides some amount of conductivity, and it is expected that in real-world use water would provide somewhere between 1 kΩ and 2 MSΩ of resistance rather than causing an open circuit. Other liquids may provide different measurable resistances or cause an open circuit.

Current device 307 includes one or both of current source Isnk and pulldown resistor Rdown. In one example, device 100 is in an active (ON) mode and can provide a relatively stable and precise current source represented by Isnk. In that case, switch SW1 would be closed to provide the current path 302 from VBUS to ground. In another example, device 100 is in an inactive (OFF) mode which provides minimal functionality and may be unable to provide a stable current source. In such an example, the device 100 may close switch SW2 (while leaving open SW1) so that resistor Rdown may provide a programmable resistance and, thus, and inferable voltage drop. Although not shown in FIG. 3, switches SW1 and SW2 may be controlled by the PMIC 124 or processor 104 or some other logic (not shown).

The second current path 304 is in parallel to the first current path 302, and second current path 304 includes a measuring resistor R_adc. R_adc may be included within analog-to-digital converter (ADC) 350 or may be separate from ADC 350. In any event, R_adc provides a known resistance between node 306 and ground. ADC 350 may measure the voltage drop provided by R_adc. The voltage drop over resistor R_adc may provide an indication of an amount of resistance attributable to liquid 305. ADC 350 may measure the voltage and then convert it to a digital signal, which it may then provide to PMIC 124/processor 104 for liquid presence detection and further actions. ADC 350 and comparator 355 are shown as being separate and discrete and not included within PMIC 124/processor 104, though the scope of embodiments is not so limited. In some instances, either one or both of ADC 350 and comparator 355 may be included within PMIC 124/processor 104.

PMIC 124/processor 104 may include hardware or software logic that receives the output from ADC 350 and then determines the presence or absence of liquid 305. When no liquid 305 is present at all, it is expected that there would be an open circuit between VBUS and node 306. However, the presence of liquid 305 would be expected to contribute some amount of resistance that would be inferred from measuring the voltage drop across resistor R_adc. As noted above, the resistance attributable to liquid 305 (assuming it is water) may be somewhere between 1000 S2 and 2 million 1, and the logic within PMIC 124/processor 104 may be programmed to detect liquid when it infers a resistance in that range. Of course, various embodiments may detect other liquids that have different resistances and/or may close multiple ones of the switches at a time and may be programmed as appropriate to detect liquid in those situations. For instance, PMIC 124/processor 104 may include a database of expected resistance ranges for different types of liquids. Furthermore, PMIC 124/processor 124 may also include logic that can recognize different expected resistances due to multiple parallel switches being closed and experiencing liquid presence.

When liquid is detected, PMIC 124/processor 104 may take any appropriate action. Such action may include putting the data interconnect receptacle 130 in a sink only mode or otherwise reducing a voltage or current at the pins. Another option may be to provide a warning on a user interface of the device 100 to tell a human user that water has been detected and that the device should be dried out and/or powered off.

The embodiment of FIG. 3 provides an additional technique to determine the presence of liquid. Specifically, comparator 355 may be used to infer resistance attributable to liquid 305. Specifically, comparator 355 may be provided a reference voltage Vref that is tuned to output either a high signal or low signal from the comparator 355 when the voltage at node 306 either rises above or crosses below Vref. Various implementations may include either one or both of comparator 355 and ADC 350. While this particular example shows ADC 350 and comparator 355, the scope of implementations may include any appropriate voltage detector that can be used to infer the presence of liquid 305.

The embodiment of FIG. 3 may include advantages over existing solutions. For instance, the embodiment of FIG. 3 is not dependent upon DRP mode or insertion of a plug to be able to detect liquid. Therefore, the embodiment of FIG. 3 may be implemented entirely within device 100 and may operate at any particular time, including operating in the background periodically to provide a warning to the user or to reduce a voltage at the pins relatively quickly after liquid exposure.

Another advantage may include the ability to detect the presence of liquid between any Victim Pin and VBUS. Such design may be more robust than existing designs that can only detect the presence of liquid between ground and SBU. In one example, PMIC 124/processor 104 may control the switching network 301 to close each of the parallel switches in turn pin-by-pin repeatedly in the background operation of the device 100 to be able to detect liquid at any one of the pins.

Figure 4:
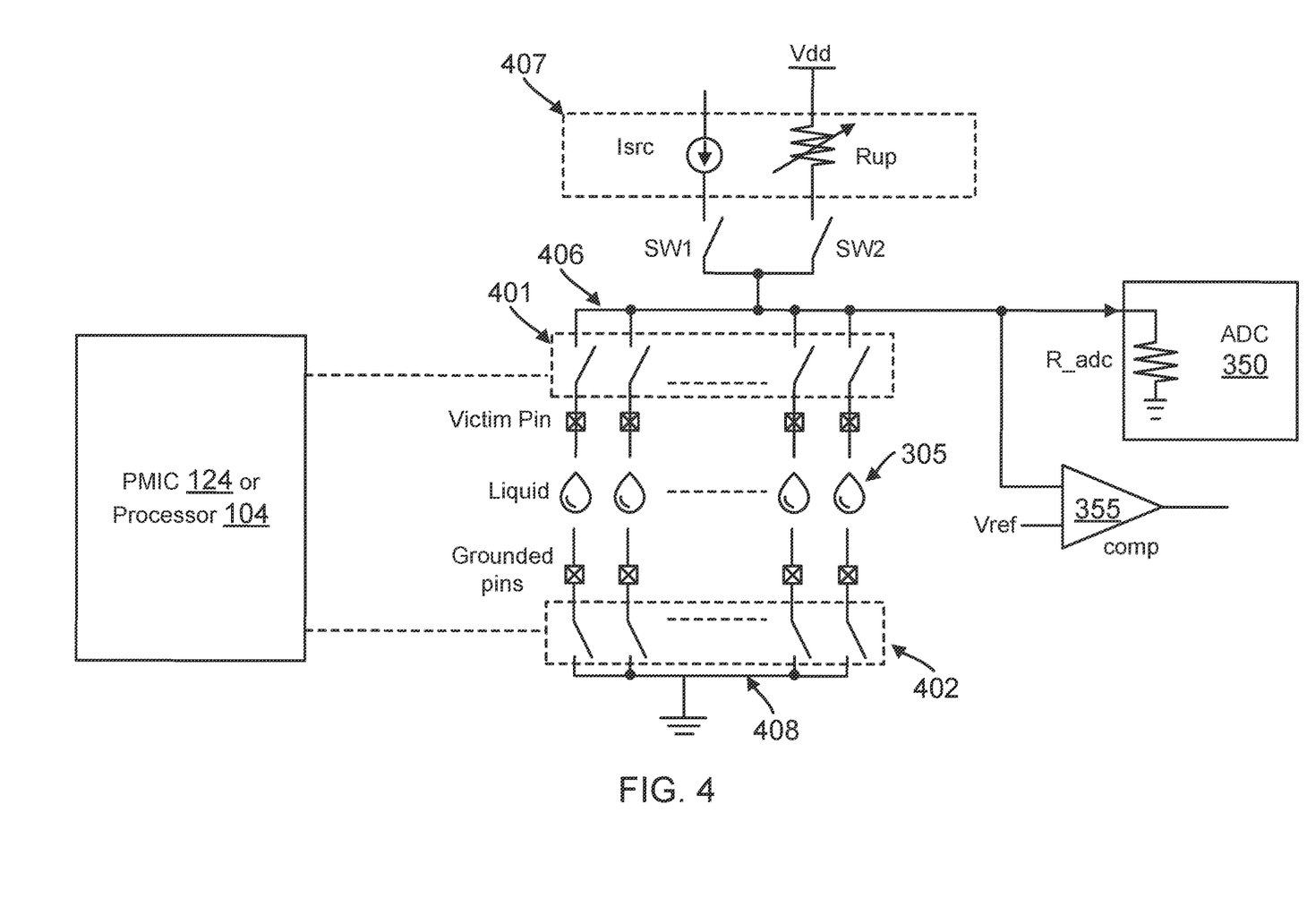
FIG. 4 is an illustration of liquid presence detection circuit, according to various embodiments.

FIG. 4 is an illustration of liquid presence detection circuit 400, which may be included within data interconnect receptacle 130 or split between data interconnect receptacle 130 and either or both of PMIC 124 and processor 104, according to various embodiments.

Whereas the embodiment of FIG. 3 used a switching network to couple each of the Victim Pins to a power source (VBUS), the embodiment of FIG. 4 uses multiple switching networks to couple different Victim Pins to different Grounded pins.

In this implementation, PMIC 124/processor 104 controls switching networks 401 and 402 to create an electrical coupling between a particular one of the Victims Pins and a Grounded pin to detect the presence of liquid 305 by, once again, inferring a resistance attributable to the liquid 305. Each Victim Pin may include any one of the pins shown in FIG. 2, except for VBUS or GND. In the example of FIG. 4, the number of parallel switches within switching network 401 may correspond to a number of Victim Pins, one switch per pin. Grounded pins may be implemented to provide any number of permutations of different victim pins and, therefore, the number of switches within switching network 402 may be the same as or different from the number of switches in switching network 401.

In one example, each one of the Victim Pins may be able to the coupled to any other of the Victim Pins as a Grounded pin. In such an example, if there are N possible Victim Pins, each Victim Pin would be able to couple to each one of the N−1 other Victim Pins. Thus, one example may include N−1 Grounded pins for each Victim Pin. The PMIC 124/processor 104 may then rotate each Victim Pin through its N−1 other pins using switching networks 401, 402 to determine the presence of liquid between any two arbitrary Victim Pins.

However, other implementations may include less circuitry and be less complex. For instance, it may be assumed that the presence of liquid may be more conveniently detected between a given Victim Pin and the few pins that are proximate the victim pin. For instance, a victim pin and its closest five neighbors may provide a reasonable opportunity for liquid presence detection. In such case, the number of Grounded pins in parallel switching elements may be less than N−1. In yet another example, the number of Grounded pins and their associated parallel switching elements may be equal to the number of Victim Pins and their number of parallel switching elements by selecting for each Victim Pin an appropriate liquid presence detection partner, such as a next adjacent pin. Those examples and other appropriate combinations of Victim Pins and Grounded pins may be used in various implementations as desired.

Once again, the PMIC 124/processor 104 may rotate through the number of Victim Pin and Grounded pin combinations by opening and closing the parallel switching elements of switching networks 401 and 402. Assuming that liquid 305 is present between a particular Victim Pin and a Grounded pin, current would be expected to flow from the current device 407 through that particular Victim Pin, the liquid 305, to the Grounded pin at node 408. Current would flow from node 406 to ground through the resistor R_adc, thereby providing a voltage to be measured and a resistance to be inferred by ADC 350 or comparator 355 (or some other voltage measurement device).

When the device 100 is in an ON state, it may then have Isrc available as a reliable and precise voltage source. In such a case, PMIC 124/processor 104 may close switch SW1 when liquid presence is being detected. When the device 100 is in an OFF state and has less functionality available, it may instead use variable resistor Rup and VDD as well as switch SW2 as a current source. In either event, current is expected to flow to ground when liquid 305 is present, and a voltage may be measured at node 406 to infer presence of liquid 305, similar to the algorithm described above with respect to FIG. 3.

The embodiment of FIG. 4 may provide advantages similar to or the same as those described above with respect to FIG. 3. Specifically, the ability to operate without a plug being attached or using DRP mode may provide for quicker liquid detection. Also, the ability to detect the presence of liquid between and among more pins than just SBU and ground may provide more robust liquid presence detection.

Figure 5:
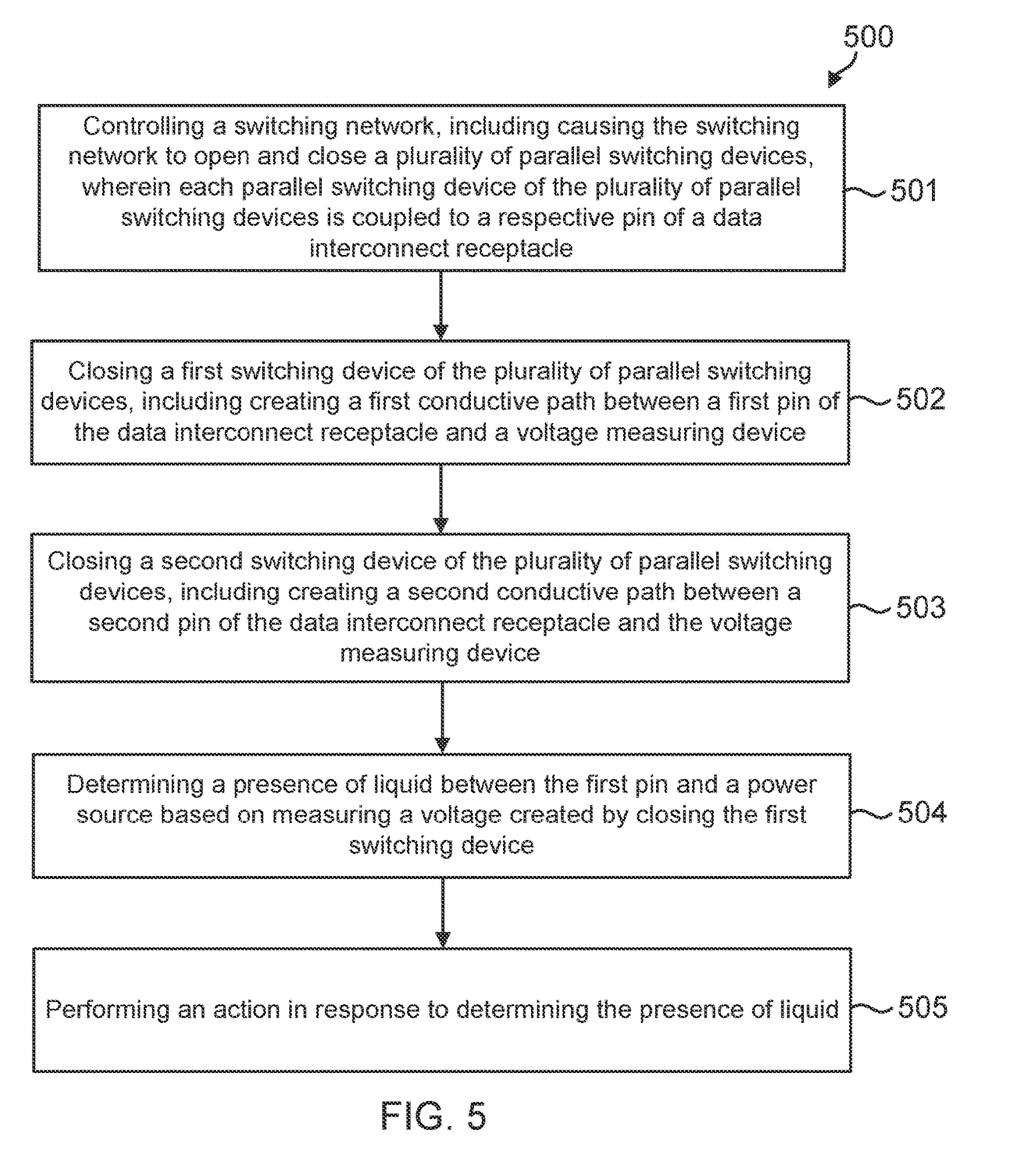
FIG. 5 is an illustration of an example method for detecting liquid in a data interconnect system, according to various embodiments.

FIG. 5 is an illustration of an example method 500 for detecting liquid in a data interconnect system, according to various embodiments. Method 500 may be performed by system 300 of FIG. 3, including an integrated circuit device (e.g., PMIC 124 processor 104) controlling switching network 301 and a switching network comprised of SW1 and SW2 to create closed-circuit current paths to allow measurement of a voltage drop attributable to the presence of liquid 305.

At action 501, the system controls a switching network. Controlling the switching network includes causing the switching network to open and close a plurality of parallel switching devices. An example of parallel switching devices may include a plurality of parallel transistors that are controlled by the integrated circuit device and are operable to selectively connect pins to a voltage measuring node. Another example of parallel switching devices may include a multiplexer that can selectively connect pins to a voltage measuring node. Continuing with the example, the parallel switching devices may be each coupled to a respective pin, such as shown in FIG. 3 in which each of the parallel switching devices are connected to a respective Victim Pin.

Actions 502-503 may in some instances be conceptually included within action 501. For instance, controlling the switching network may include closing a first switching device of the plurality of parallel switching devices. Action 502 may further include creating a first conductive path between a first one of the pins and a voltage measuring device. A given pin may be selected by the system when the pin is not occupied, such as not in use to conduct signals or electrical power. An example is selecting one of the D+/− pins when it is not used by a USB physical interface (PHY) or Automatic Power Source Detection (APSD), selecting a SBU pin when it is not used by a codec, selecting a CC pin when it is not used by the receptacle to detect connection, and the like.

Action 503 may be similar to action 502. For instance, action 503 may include closing a second switching device of the plurality of parallel switching devices, including creating a second conductive path between a second pin and the voltage measuring device. Example first and second conductive paths are shown as path 302 of FIG. 3. For instance, when a conductive liquid is present between a power source (e.g., VBUS) and a selected pin, current may be conducted between the power source and ground through the conductive path.

While actions 502-503 address two instances of a switching device creating a closed circuit with a respective pin, it is understood that the scope of implementations may include any appropriate number of plural pins and plural parallel switching devices.

An additional current path is shown in FIG. 3 as current path 304, which allows current to flow to ground through a resistor, such as R_adc. Action 504 includes determining a presence of liquid between the first pin and a power source based on measuring the voltage created by closing the first switching device. An example is shown in FIG. 3 in which current flowing through resistor R_adc may cause a voltage drop which can be measured by either or both of ADC 350 and comparator 355. A voltage drop within a particular range may be indicative of a resistance within a particular range, which may allow the system to infer a presence of liquid. Furthermore, action 504 may also include determining the presence of the liquid based on measuring a voltage created by closing the second switching device. In fact, in a system with multiple selectable switching devices and pins, a voltage between any one or multiple ones of the pins and ground may indicate presence of liquid.

At action 505, the system may perform an action in response to determining the presence of liquid. One example action includes displaying a warning on a user interface of a wireless device to alert a user to the presence of liquid. Another example action may include putting the data interconnect receptacle in a sink mode and/or reducing a voltage at one or more of the pins in the receptacle. Of course, the scope of implementations is not limited to those actions, as any appropriate action to address the presence of liquid at a data interconnect may be performed.

Figure 6:
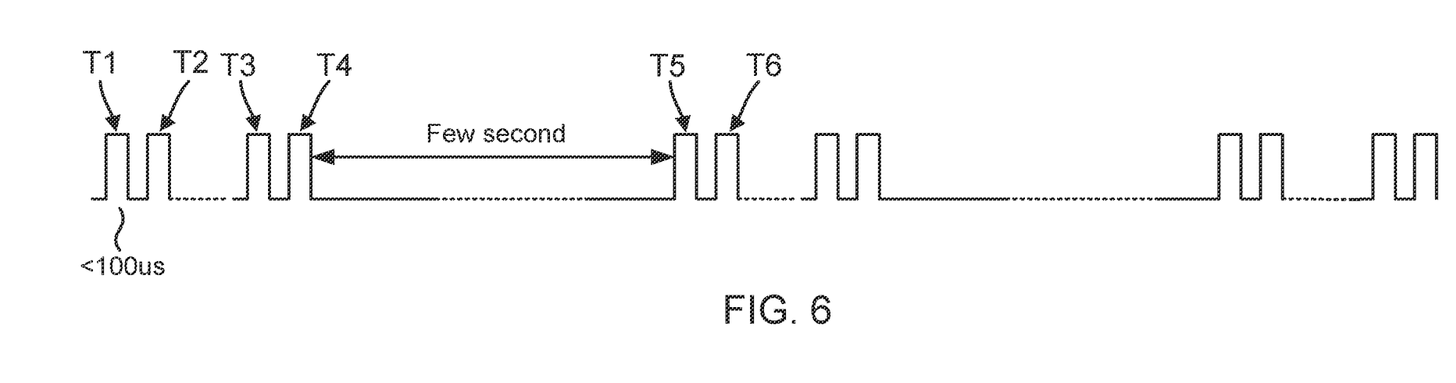
FIG. 6 is an illustration of an example timeline for performing liquid presence detection, according to various embodiments.

The scope of embodiments is not limited to the series of actions shown in FIG. 5. Rather, other embodiments may add, omit, rearrange, or modify one or more of the actions. For instance, some embodiments may repeat actions 502-503 according to a periodic interval. An example is shown in FIG. 6, which indicates an example timeline. Times T1-T4 indicate closing and opening a respective one of the parallel switching devices. Thus, time T1 may include coupling a first pin to the node, and after the first pin is uncoupled from the node another pin is coupled to the node at time T2 and then uncoupled, and on and on. This repetition allows each pin to be examined in turn for liquid presence detection. Once all of the pins (or some appropriate number fewer than all of the pins) have been examined for liquid presence, the algorithm may wait for a few seconds before rotating through the pins again beginning at time T5. Of course, specific indication of times, such as 100 µs for a measurement of a pin and a few seconds between rotation cycles are for example only, and the scope of implementations may include any appropriate timing.

Figure 7:
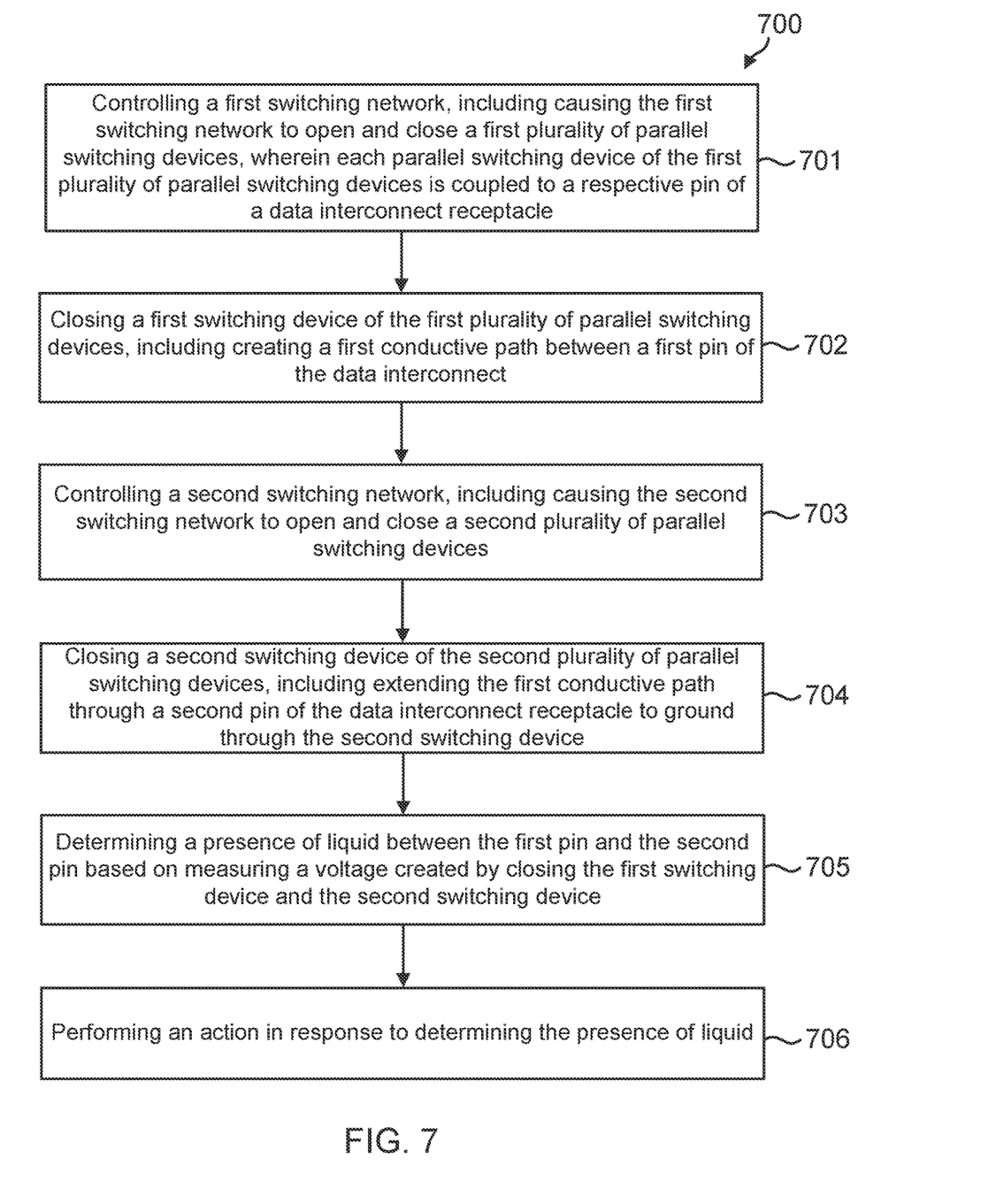
FIG. 7 is an illustration of an example method for detecting liquid in a data interconnect system, according to various embodiments.

FIG. 7 is an illustration of an example method 700 for detecting liquid in a data interconnect system, according to various embodiments. Method 700 may be performed by system 400 of FIG. 4, including an integrated circuit device (e.g., PMIC 124 processor 104) controlling switching networks 401, 402 and a switching network comprised of SW1 and SW2 to create closed-circuit current paths to allow measurement of a voltage drop attributable to the presence of liquid 305.

At action 701, the system controls a first switching network, which may include causing the first switching network to open and close a first plurality of parallel switching devices. An example is shown at switching network 401 of FIG. 4. Each of the parallel switches may be embodied as any appropriate switching mechanism, such as a transistor. Furthermore, some implementations may use a multiplexer as switching network 401. The same is true of switching network 402.

Further in this example, each of the parallel switching devices is coupled to a respective pin of the data interconnect receptacle, as also shown in FIG. 4. Action 702 may be performed as part of action 701 and include closing a first switching device of the first plurality of parallel switching devices. Action 702 may include creating a first conductive path between a first pin of the data interconnect receptacle and a voltage measuring device. For instance, switching network 401 may create a conductive path between any one of the Victim Pins and node 406. A voltage measuring device, such as one or both of ADC 350 and comparator 355 may be connected to the node 406. As with method 500, a given pin may be selected when it is not occupied.

At action 703, the system may control a second switching network, including causing the second switching network to open and close a second plurality of parallel switching devices. An example is shown in FIG. 4 at switching network 402, which connects a plurality of pins (labeled "Grounded pins") to node 408 and ground. When a particular switching device of the first switching network 401 and a particular switching device of the second switching network 402 are selected together at action 704, it provides a connection between a particular Victim Pin and a Grounded pin, which is one permutation of pins available within the receptacle. There may be multiple permutations available, and the system may be able to create a current path through a given permutation of pins by selecting particular ones of the switches of network 401 and a particular one of the switches of network 402. In fact, some implementations may allow any permutation that excludes a GND pin as a Victim Pin or a VBUS pin as a Victim Pin.

An example use of actions 701-704 is to allow the system to have a set of pin-to-pin liquid checks and that the system can rotate through to provide a more robust determination of whether liquid is actually present. Including more pin-to-pin permutations for liquid presence detection may be expected in some instances to provide a higher probability of a true positive. Various embodiments may include any appropriate number of pin-to-pin permutations for use in a given application.

Action 705 includes determining the presence of liquid between the first pin and the second pin based on measuring the voltage created by closing the first switching device and the second switching device. An example of FIG. 4, the voltage may be created by current flowing through the resistor R_adc, and the voltage may be indicative of a resistance expected to be attributable to the presence of liquid 305.

Action 706 may be the same as or similar to action 505.

Method 700 may be performed according to the timeline shown in FIG. 6 in some embodiments. For instance, each of times T1-T4 may represent a pair of switches being closed to select a particular permutation of pins. Once some or all of the pin permutations have been rotated through, the system may take a pause and pick back up at time T5.

Further aspects of the present disclosure include the following clauses:

1. A data interconnect system comprising:
a plurality of pins arranged within a receptacle, a first one of the pins being a power pin, wherein the pins are electrically isolated from each other within the receptacle;
a first switching network including a first plurality of parallel switching devices, each of the parallel switching devices of the first plurality of parallel switching devices coupling a respective one of the pins to a node;
a first current path from the node to ground, the first current path including a current device; and
a second current path, parallel to the first current path, the second current path including a resistor coupling the node to ground.

2. The data interconnect system of clause 1, further comprising an analog to digital converter coupled to the resistor.

3. The data interconnect system of clause 1, further comprising a comparator having a first input coupled to the node and a second input coupled to a reference voltage.

4. The data interconnect system of clause 1, further comprising a voltage detector coupled to the node.

5. The data interconnect system of clauses 1-4, wherein the current device included in the first current path comprises a current source.

6. The data interconnect system of clauses 1-5, wherein the current device included in the first current path comprises a variable resistor.

7. The data interconnect system of clauses 1-6, further comprising an integrated circuit device configured to operate the parallel switching devices to create closed circuits between the plurality of pins and the node.

8. The data interconnect system of clauses 1-7, wherein the current device includes:
a current source coupled to ground;
a variable resistor coupled to ground;
a second switching network coupling the current source and the variable resistor to the node.

9. The data interconnect system of clause 8, further comprising control circuitry coupled to the second switching network, the control circuitry configured to operate the second switching network by creating closed circuits between the current source and the variable resistor.

10. A data interconnect system comprising:
a plurality of pins arranged within a receptacle, wherein the pins are electrically isolated from each other in the receptacle;

a first switching network including a first plurality of parallel switching devices, each of the parallel switching devices of the first plurality of parallel switching devices coupling a respective one of the pins to a first node;
a current device coupled to the first node;
a second switching network including a second plurality of parallel switching devices, each of the parallel switching devices of the second plurality of parallel switching devices coupling a respective one of the pins to a second node, wherein the second node is coupled to ground;
a power source coupled to the first node; and
a resistor coupling the first node to ground.

11. The data interconnect system of clause 10, further comprising an analog to digital converter coupled to the resistor.

12. The data interconnect system of clause 10, further comprising a comparator having a first input coupled to the first node and a second input coupled to a reference voltage.

13. The data interconnect system of clause 10, further comprising a voltage detector coupled to the first node.

14. The data interconnect system of clauses 10-13, wherein the current device included comprises a current source.

15. The data interconnect system of clauses 10-14, wherein the current device comprises a variable resistor.

16. The data interconnect system of clauses 10-15, further comprising an integrated circuit device configured to operate the first plurality of parallel switching devices to create closed circuits between the plurality of pins and the first node.

17. The data interconnect system of clauses 10-16, further comprising an integrated circuit device configured to operate the second plurality of parallel switching devices to create closed circuits between the plurality of pins and the second node.

18. The data interconnect system of clauses 10-17, wherein the current device includes:
a current source coupled to ground;
a variable resistor coupled to ground;
a third switching network coupling the current source and the variable resistor to the first node.

19. The data interconnect system of clause 18, further comprising an integrated circuit device configured to operate the third switching network by creating closed circuits between the current source and the variable resistor.

20. A method comprising:
controlling a switching network, including causing the switching network to open and close a plurality of parallel switching devices, wherein each parallel switching device of the plurality of parallel switching devices is coupled to a respective pin of a data interconnect receptacle, further wherein controlling the switching network includes:
closing a first switching device of the plurality of parallel switching devices, including creating a first conductive path between a first pin of the data interconnect receptacle and a voltage measuring device; and
closing a second switching device of the plurality of parallel switching devices, including creating a second conductive path between a second pin of the data interconnect receptacle and the voltage measuring device;
determining a presence of liquid between the first pin and a power source based on measuring a voltage created by closing the first switching device; and
performing an action in response to determining the presence of liquid.

21. The method of clause 20, further comprising:
determining presence of liquid between the second pin and the power source based on measuring a voltage created by closing the second switching device.

22. The method of clauses 20-21, wherein performing the action includes displaying a warning on a user interface device of a wireless device that includes the data interconnect receptacle.

23. The method of clauses 20-22, wherein performing the action includes putting the data interconnect receptacle into a sink mode.

24. The method of clauses 20-23, wherein performing the action includes reducing a voltage level of the first pin or another pin within the data interconnect receptacle.

25. The method of clauses 20-24, further comprising:
repeating closing the first switching device and closing the second switching device according to a periodic interval.

26. A method comprising:
controlling a first switching network, including causing the first switching network to open and close a first plurality of parallel switching devices, wherein each parallel switching device of the first plurality of parallel switching devices is coupled to a respective pin of a data interconnect receptacle, further wherein controlling the first switching network includes:
closing a first switching device of the first plurality of parallel switching devices, including creating a first conductive path between a first pin of the data interconnect receptacle and a voltage measuring device; and
controlling a second switching network, including causing the second switching network to open and close a second plurality of parallel switching devices, further wherein controlling the second switching network includes:
closing a second switching device of the second plurality of parallel switching devices, including extending the first conductive path through a second pin of the data interconnect receptacle to ground through the second switching device;
determining a presence of liquid between the first pin and the second pin based on measuring a voltage created by closing the first switching device and the second switching device; and
performing an action in response to determining the presence of liquid.

27. The method of clause 26, further comprising:
controlling a third switching network to couple the first pin to a power source.

28. The method of clauses 26-27, further comprising:
controlling the first switching network and the second switching network to further create a plurality of current paths between multiple permutations of pins of the data interconnect receptacle.

29. The method of clause 28, wherein creating the plurality of current paths between multiple permutations includes creating each current path of the plurality of current paths in turn and permutation-bi-permutation and according to a periodic interval.

30. A data interconnect receptacle comprising:
a plurality of pins arranged within the receptacle, wherein the pins are electrically isolated from each other within the receptacle;
switching means for coupling and decoupling each pin of the plurality of pins to either power or ground;
means for controlling the switching means; and
means for determining a presence of liquid within the receptacle based at least in part on a voltage measured on a current path created by the switching means.

31. The data interconnect receptacle of clause 30, wherein the determining means comprises an analog to digital converter configured to measure a voltage across a resistor within the current path.

32. The data interconnect receptacle of clause 30, wherein the determining means comprises a comparator having a first input coupled to a reference voltage and a second input coupled to a voltage produced by a resistor within the current path.

33. The data interconnect receptacle of clauses 30-32, further comprising a current source, wherein the switching means include means for coupling and decoupling each pin of the plurality of pins to a current source and to a voltage pin.

34. The data interconnect receptacle of clauses 30-33, wherein the switching means is configured to connect any first pin of the plurality of pins to any second pin of the plurality of pins between a power source and ground.

35. A non-transitory computer-readable medium having program code recorded thereon for liquid presence detection, the program code comprising:
code for controlling a plurality of switches to couple and decouple a plurality of data interconnect pins to either power or ground;
code for measuring a voltage produced by a resistor within a current path created by the plurality of switches; and
code for determining a presence of liquid on one or more of the data interconnect pins based at least in part on the voltage.

36. The non-transitory computer-readable medium of clause 35, wherein the code for controlling the plurality of switches includes code for coupling and decoupling each data interconnect pin of the plurality of data interconnect pins to a current source and to a voltage pin.

37. The non-transitory computer-readable medium of clauses 35-36, wherein the code for controlling the plurality of switches includes code for coupling any first data interconnect pin of the plurality of data interconnect pins to any second data interconnect pin of the plurality of data interconnect pins between a power source and ground.

38. The non-transitory computer-readable medium of clauses 35-37, wherein the code for measuring the voltage includes code for receiving a digital output from a voltage measurement device in communication with the resistor.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A data interconnect system comprising:
a plurality of pins arranged within a receptacle, a first one of the pins being a power pin, wherein the pins are electrically isolated from each other within the receptacle;
a first switching network including a first plurality of parallel switching devices, each of the parallel switching devices of the first plurality of parallel switching devices coupling a respective one of the pins to a node;
a first current path from the node to ground, the first current path including a current device; and
a second current path, parallel to the first current path, the second current path including a resistor coupling the node to ground.

2. The data interconnect system of claim 1, further comprising an analog to digital converter coupled to the resistor.

3. The data interconnect system of claim 1, further comprising a comparator having a first input coupled to the node and a second input coupled to a reference voltage.

4. The data interconnect system of claim 1, further comprising a voltage detector coupled to the node.

5. The data interconnect system of claim 1, wherein the current device included in the first current path comprises a current source.

6. The data interconnect system of claim 1, wherein the current device included in the first current path comprises a variable resistor.

7. The data interconnect system of claim 1, further comprising an integrated circuit device configured to operate the parallel switching devices to create closed circuits between the plurality of pins and the node.

8. The data interconnect system of claim 1, wherein the current device includes:
a current source coupled to ground;
a variable resistor coupled to ground;
a second switching network coupling the current source and the variable resistor to the node.

9. The data interconnect system of claim 8, further comprising control circuitry coupled to the second switching network, the control circuitry configured to operate the second switching network by creating closed circuits between the current source and the variable resistor.

10. A data interconnect system comprising:
a plurality of pins arranged within a receptacle, wherein the pins are electrically isolated from each other in the receptacle;
a first switching network including a first plurality of parallel switching devices, each of the parallel switching devices of the first plurality of parallel switching devices coupling a respective one of the pins to a first node;
a current device coupled to the first node;
a second switching network including a second plurality of parallel switching devices, each of the parallel switching devices of the second plurality of parallel switching devices coupling a respective one of the pins to a second node, wherein the second node is coupled to ground;
a power source coupled to the first node; and
a resistor coupling the first node to ground.

11. The data interconnect system of claim 10, further comprising an analog to digital converter coupled to the resistor.

12. The data interconnect system of claim 10, further comprising a comparator having a first input coupled to the first node and a second input coupled to a reference voltage.

13. The data interconnect system of claim 10, further comprising a voltage detector coupled to the first node.

14. The data interconnect system of claim 10, wherein the current device included comprises a current source.

15. The data interconnect system of claim 10, wherein the current device comprises a variable resistor.

16. The data interconnect system of claim 10, further comprising an integrated circuit device configured to operate the first plurality of parallel switching devices to create closed circuits between the plurality of pins and the first node.

17. The data interconnect system of claim 10, further comprising an integrated circuit device configured to operate the second plurality of parallel switching devices to create closed circuits between the plurality of pins and the second node.

18. The data interconnect system of claim 10, wherein the current device includes:
a current source coupled to ground;
a variable resistor coupled to ground;
a third switching network coupling the current source and the variable resistor to the first node.

19. The data interconnect system of claim 18, further comprising an integrated circuit device configured to operate the third switching network by creating closed circuits between the current source and the variable resistor.

20. A method comprising:
controlling a switching network, including causing the switching network to open and close a plurality of parallel switching devices, wherein each parallel switching device of the plurality of parallel switching devices is coupled to a respective pin of a data interconnect receptacle, further wherein controlling the switching network includes:
closing a first switching device of the plurality of parallel switching devices, including creating a first conductive path between a first pin of the data interconnect receptacle and a voltage measuring device; and
closing a second switching device of the plurality of parallel switching devices, including creating a second conductive path between a second pin of the data interconnect receptacle and the voltage measuring device;
determining a presence of liquid between the first pin and a power source based on measuring a voltage created by closing the first switching device; and
performing an action in response to determining the presence of liquid.

21. The method of claim 20, further comprising:
determining presence of liquid between the second pin and the power source based on measuring a voltage created by closing the second switching device.

22. The method of claim 20, wherein performing the action includes displaying a warning on a user interface device of a wireless device that includes the data interconnect receptacle.

23. The method of claim 20, wherein performing the action includes putting the data interconnect receptacle into a sink mode.

24. The method of claim 20, wherein performing the action includes reducing a voltage level of the first pin or another pin within the data interconnect receptacle.

25. The method of claim 20, further comprising:
repeating closing the first switching device and closing the second switching device according to a periodic interval.

26. A method comprising:
controlling a first switching network, including causing the first switching network to open and close a first plurality of parallel switching devices, wherein each parallel switching device of the first plurality of parallel switching devices is coupled to a respective pin of a data interconnect receptacle, further wherein controlling the first switching network includes:
closing a first switching device of the first plurality of parallel switching devices, including creating a first conductive path between a first pin of the data interconnect receptacle and a voltage measuring device; and
controlling a second switching network, including causing the second switching network to open and close a second plurality of parallel switching devices, further wherein controlling the second switching network includes:
closing a second switching device of the second plurality of parallel switching devices, including extending the first conductive path through a second pin of the data interconnect receptacle to ground through the second switching device;
determining a presence of liquid between the first pin and the second pin based on measuring a voltage created by closing the first switching device and the second switching device; and
performing an action in response to determining the presence of liquid.

27. The method of claim 26, further comprising:
controlling a third switching network to couple the first pin to a power source.

28. The method of claim 26, further comprising:
controlling the first switching network and the second switching network to further create a plurality of current paths between multiple permutations of pins of the data interconnect receptacle.

29. The method of claim 28, wherein creating the plurality of current paths between multiple permutations includes creating each current path of the plurality of current paths in turn and permutation-bi-permutation and according to a periodic interval.

* * * * *